(12) United States Patent
Kurata et al.

(10) Patent No.: US 8,065,149 B2
(45) Date of Patent: Nov. 22, 2011

(54) UNSUPERVISED LEXICON ACQUISITION FROM SPEECH AND TEXT

(75) Inventors: Gakuto Kurata, Yamato (JP); Shinsuke Mori, Yokohama (JP); Masafumi Nishimura, Yokohama (JP)

(73) Assignee: Nuance Communications, Inc., Burlington, MA (US)

( * ) Notice: Subject to any disclaimer, the term of this patent is extended or adjusted under 35 U.S.C. 154(b) by 930 days.

(21) Appl. No.: 12/043,810

(22) Filed: Mar. 6, 2008

(65) Prior Publication Data

US 2008/0221890 A1 Sep. 11, 2008

(30) Foreign Application Priority Data

Mar. 6, 2007 (JP) ................................. 2007-055522

(51) Int. Cl.
*G10L 13/00* (2006.01)
(52) U.S. Cl. ........................................ 704/260; 704/243
(58) Field of Classification Search .................. 704/260, 704/243
See application file for complete search history.

(56) References Cited

U.S. PATENT DOCUMENTS

2006/0015326 A1* 1/2006 Mori et al. ........................ 704/9

OTHER PUBLICATIONS

Tohru Nagano et al., A Stochastic Approach to Phoneme and Accent Estimation, Interspeach 2005 Lisbon, pp. 3293-3296 (Sep. 4, 2005).
Shinsuke More et al., Word N-gram Probability Estimation From a Japanese Raw Corpus, IBM Research, Tokyo Research Laboratory, pp. 1-4.

* cited by examiner

*Primary Examiner* — Jakieda Jackson
(74) *Attorney, Agent, or Firm* — Wolf, Greenfield & Sacks, P.C.

(57) ABSTRACT

Techniques for acquiring, from an input text and an input speech, a set of a character string and a pronunciation thereof which should be recognized as a word. A system according to the present invention: selects, from an input text, plural candidate character strings which are candidates to be recognized as a word; generates plural pronunciation candidates of the selected candidate character strings; generates frequency data by combining data in which the generated pronunciation candidates are respectively associated with the character strings; generates recognition data in which character strings respectively indicating plural words contained in the input speech are associated with pronunciations; and selects and outputs a combination contained in the recognition data, out of combinations each consisting of one of the candidate character strings and one of the pronunciation candidates.

12 Claims, 10 Drawing Sheets

| SUBSEQUENT CHARACTER STRING / PRECEDING CHARACTER STRING | N ン | NSAN ン酸 | NSAN KA ン酸化 | NSANKA DA ン酸化だ | SAN 酸 | SANKA 酸化 | SANKA DA 酸化だ | KA 化 | KA DA 化だ | DA だ |
|---|---|---|---|---|---|---|---|---|---|---|
| RI リ | 0.5 | 0.2 | 0.2 | 0.1 | 0 | 0 | 0 | 0 | 0 | 0 |
| RIN リン | 0 | 0 | 0 | 0 | 0.6 | 0.3 | 0.1 | 0 | 0 | 0 |
| RINSAN リン酸 | 0 | 0 | 0 | 0 | 0 | 0 | 0 | 0.8 | 0.2 | 0 |
| NSANKA ン酸化 | 0 | 0 | 0 | 0 | 0 | 0 | 0 | 0 | 0 | 1 |
| N ン | 0 | 0 | 0 | 0 | 0.6 | 0.3 | 0.1 | 0 | 0 | 0 |
| NSAN ン酸 | 0 | 0 | 0 | 0 | 0 | 0 | 0 | 0.8 | 0.2 | 0 |
| NSANKA ン酸化 | 0 | 0 | 0 | 0 | 0 | 0 | 0 | 0 | 0 | 1 |
| SAN 酸 | 0 | 0 | 0 | 0 | 0 | 0 | 0 | 0.8 | 0.2 | 0 |
| SANKA 酸化 | 0 | 0 | 0 | 0 | 0 | 0 | 0 | 0 | 0 | 1 |
| KA 化 | 0 | 0 | 0 | 0 | 0 | 0 | 0 | 0 | 0 | 1 |

FIG. 2

| SUBSEQUENT WORD / PRECEDING WORD | ... | SANKA 酸化 | SANKATOIU 酸化という | ... |
|---|---|---|---|---|
| ⋮ | | ⋮ | ⋮ | |
| KOREWORIN これをリン | ... | 0.05 | 0.05 | ... |
| RIN リン | ... | 0.1 | 0.1 | ... |
| RINSAN リン酸 | ... | 0 | 0 | ... |
| RINSANKA リン酸化 | ... | 0 | 0 | ... |
| ⋮ | | ⋮ | ⋮ | |

| | RINSANKA |
| リン酸化 | リンサンカ (PRONUNCIATION CANDIDATE 1) :S1 |
| (CANDIDATE | RINSUKA |
| CHARACTER | リンスカ (PRONUNCIATION CANDIDATE 2) :S2 |
| STRING) | RINSANBA |
| | リンサンバ (PRONUNCIATION CANDIDATE 3) :S3 |
| | RINSUBAKE |
| | リンスバケ (PRONUNCIATION CANDIDATE 4) :S4 |
| | RINSANKE |
| | リンサンケ (PRONUNCIATION CANDIDATE 5) :S5 |
| | RINSUKE |
| | リンスケ (PRONUNCIATION CANDIDATE 6) :S6 |

FIG. 5

| SUBSEQUENT WORD / PRECEDING WORD | ... | 酸化<br>(サンカ)<br>SANKA | 酸化<br>(スカ)<br>SUKA | 酸化<br>(スバケ)<br>SUBAKE | 酸化という<br>(サンカトイウ)<br>SANKATOIU | ... |
|---|---|---|---|---|---|---|
| ⋮ | | ⋮ | ⋮ | ⋮ | ⋮ | |
| これをリン<br>(コレヲリン)<br>KOREWORIN | ... | 0.05 | 0.05 | 0.05 | 0.15 | ... |
| リン<br>(リン)<br>RIN | ... | 0.1 | 0.1 | 0.1 | 0.1 | ... |
| リン酸<br>(リンサン)<br>RINSAN | ... | 0 | 0 | 0 | 0 | ... |
| リン酸<br>(リンス)<br>RINSU | ... | 0 | 0 | 0 | 0 | ... |
| リン酸化<br>(リンサンカ)<br>RINSANKA | ... | 0 | 0 | 0 | 0 | ... |
| リン酸化<br>(リンスバケ)<br>RINSUBAKE | ... | 0 | 0 | 0 | 0 | ... |
| ⋮ | | ⋮ | ⋮ | ⋮ | ⋮ | |

FIG. 9

UNSUPERVISED LEXICON ACQUISITION FROM SPEECH AND TEXT

CROSS-REFERENCE TO RELATED APPLICATIONS

This application claims priority under 35 U.S.C. §119 to Japanese Patent Application No. 2007-55522 filed Mar. 6, 2007, the entire text of which is specifically incorporated by reference herein.

BACKGROUND OF THE INVENTION

The present invention relates to a system, a method and a program for acquiring a character string and the like that should be newly recognized as a word. Particularly, the present invention relates to a system, a method and a program for acquiring, for speech processing, a set of a character string and a pronunciation that should be recognized as a word.

In a large vocabulary continuous speech recognition (LVCSR) system, highly accurate speech recognition requires a word dictionary in which words and phrases included in the speech are recorded, and a language model by which an appearance frequency and the like of each word or phrase can be derived. In addition, in order to improve accuracy of processing of the speech recognition, it is desirable that these word dictionary and language model cyclopedically contain the words included in the speech that should be recognized. On the other hand, because there are limitations on both the capacity of a storage device for memorizing a dictionary and the like, and the performance of a CPU which calculates frequency values, it is desirable that these word dictionary and language model be minimal to the extent that they do not contain unnecessary words.

However, enormous time, effort and expense are required for manual construction of the dictionary containing even only a minimum of words and phrases. More specifically, when a dictionary is constructed from Japanese texts, for example, it is necessary to analyze segmentations of words, firstly, and then to assign a correct pronunciation to each of the segmented words. Since a pronunciation is information on a reading way expressed with phonetic symbols and the like, expert linguistic knowledge is necessary in order to assign such information of a pronunciation in some cases. Such work and expense can be a problem particularly when speech recognition is attempted in a specific field of expertise. This is because information such as a general dictionary that have been accumulated cannot be very useful, and also because sufficient time, effort and expense cannot be spent due to a low demand.

BRIEF SUMMARY OF THE INVENTION

Against this background, conventional studies have been made for techniques for automatically detecting, to some extent, character strings that should be newly recognized as words, and pronunciations thereof. However, some of these techniques merely support manual detection work, and some others thereof require a lot of manual correction work since the detected character strings contain a lot of unnecessary words even though the character strings and the pronunciations can be detected.

Consequently, an object of an embodiment of the present invention is to provide a system, a method and a program which are capable of solving the abovementioned problem. This object is achieved by a combination of characteristics described in the independent claims in the scope of claims. Additionally, the dependent claims define further advantageous specific examples of the present invention.

In order to solve the above-mentioned problem, in a first aspect of the present invention, provided is a system for acquiring, from an input text and an input speech, a set of a character string and a pronunciation thereof which should be recognized as a word. The system includes a candidate selecting unit for selecting, from an input text, at least one candidate character string which becomes a candidate to be recognized as a word; a pronunciation generating unit for generating at least one pronunciation candidate of each of the selected candidate character strings by combining pronunciations of all characters contained in the selected candidate character string, while one or more pronunciations are predetermined for each of the characters; a frequency generating unit for generating frequency data by combining data in which the generated pronunciation candidates are respectively associated with the character strings, with language model data prepared by previously recording numerical values based on frequencies at which respective words appear in the text, the frequency data indicating appearance frequencies of the respective sets each consisting of a character string indicating a word, and a pronunciation; a speech recognizing unit for performing, based on the generated frequency data, speech recognition on the input speech to generate recognition data in which character strings respectively indicating plural words contained in the input speech are associated with pronunciations; and an outputting unit for selecting and outputting a combination contained in the recognition data, out of combinations each consisting of one of the candidate character strings and one of the candidates of a pronunciation thereof. Additionally, a program for enabling an information processing apparatus to function as the system, and a method for enabling an information processing apparatus to acquire a word by using the information processing apparatus as the system, are provided.

Note that the above described summary of the invention does not list all of necessary characteristics of the present invention, and that sub-combinations of groups of these characteristics can also be included in the invention.

BRIEF DESCRIPTION OF THE SEVERAL VIEWS OF THE DRAWINGS

For a more complete understanding of the present invention and the advantage thereof, reference is now made to the following description taken in conjunction with the accompanying drawings.

FIG. 2 shows an example where frequencies at which character strings and pronunciations thereof appear have been calculated.

FIG. 5 shows a specific example of candidate data 50.

FIG. 9 shows one example of frequency data generated in S720 and memorized in a frequency memorizing unit 325.

DETAILED DESCRIPTION OF THE INVENTION

Although the present invention will be described below by way of an embodiment of the invention, the following embodiment does not limit the invention according to the scope of claims, and not all of combinations of characteristics described in the embodiment are essential for the solving means of the invention.

Figure 1:
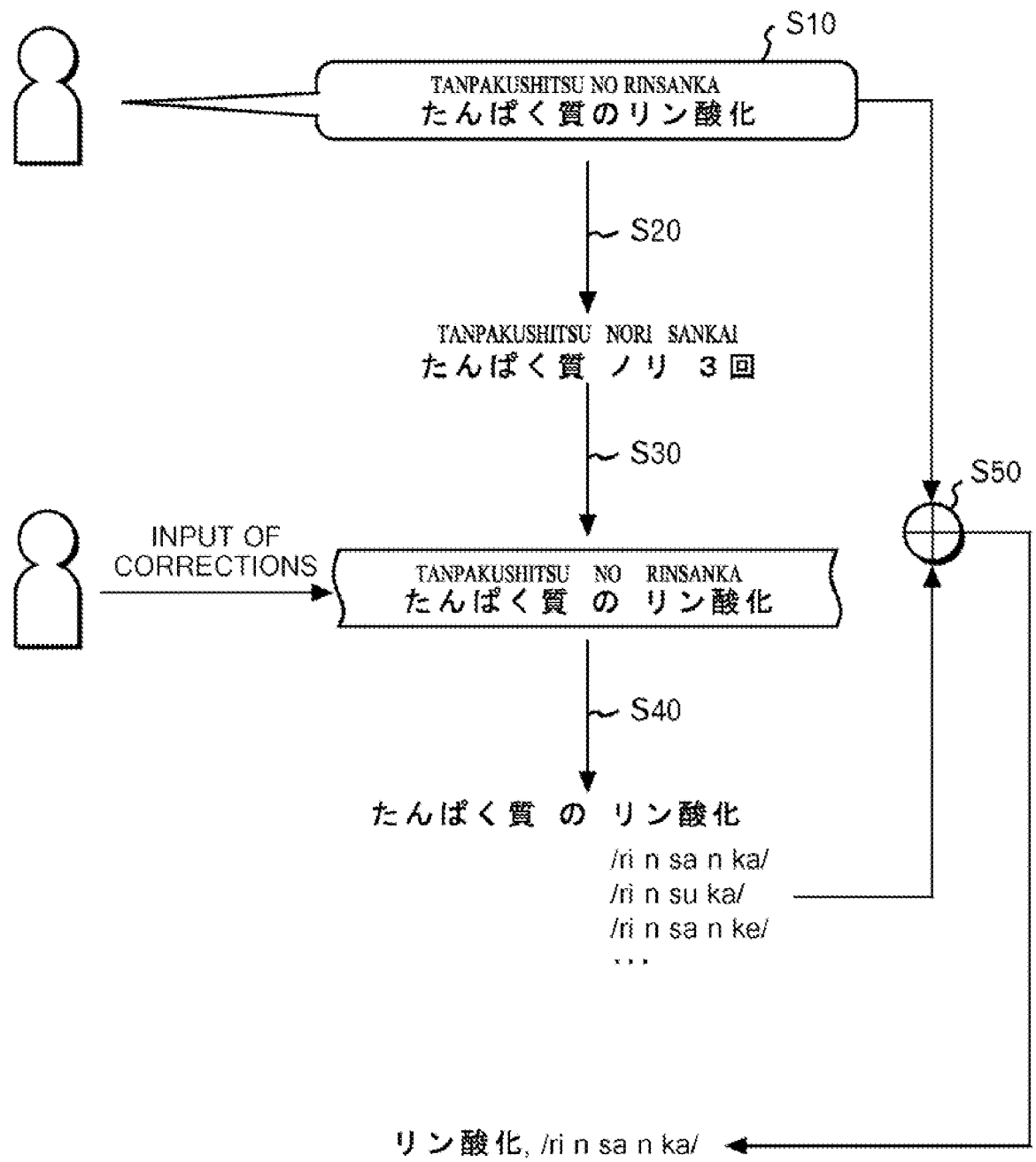
FIG. 1 shows an example of processing in which a set of a character string and a pronunciation thereof which should be recognized as a word are newly acquired.

FIG. 1 shows an example of processing for newly acquiring a set of a character string and a pronunciation thereof which should be recognized as a word. This first example is an example where a speech recognition system (for example, refer to Product explanation for IBM ViaVoice for Windows [homepage URL: http://japan.nuance.com/viavoice/]) is used for acquisition of the character string and the pronunciation. Firstly, when a user utters "tanpakushitsu no rinsanka (phosphorylation of protein)" to the speech recognition system (S10), the speech recognition system generates a text showing a content of the utterance by using the utterance as an input speech (S20). In this example, accuracy of the recognition is not very high because the word "rinsanka" has not been registered in the dictionary. Similarly, accuracy of the recognition is not very high even if the word has been registered therein, since the recognition is processed by assuming that an appearance frequency of the word is extremely low. For this reason, the utterance is misrecognized as "tanpakushitsu nori sankai (protein paste three times)".

When, by seeing a text which is a result of the recognition, the user notices that it has been misrecognized, the user inputs a correct character string of a misrecognized part to correct the text (S30). Then, a system which supports acquisition of a character string generates plural candidates for a pronunciation the character string (hereinafter, simply referred to as pronunciation candidates) from the corrected text (S40). For example, the system is previously provided with a kanji dictionary, and thus retrieves from the dictionary pronunciations "san" and "su" associated with a kanji character indicating "acid". Additionally, the system retrieves pronunciations "ka" and "ke" associated with a kanji character indicating "becoming". When the retrieved pronunciations are combined together, pronunciations "ri-n-sa-n-ka", "ri-n-su-ka" and "ri-n-sa-n-ke" are generated as candidates of a pronunciation.

Then, the system compares each of these pronunciation candidates with the input speech acquired from the user in S10. As a result, the candidate "ri-n-sa-n-ka" which is a pronunciation that is most similar to the input speech is selected and outputted in association with a character string "rinsanka (phosphorylation)" (S50). By using the speech recognition system in this manner, a character string of a new word not registered in the dictionary of the speech recognition system can be acquired in association with a pronunciation thereof.

As has been described above, by such processing as described in the first example, a new word can be acquired. However, a large amount of work and time is required if misrecognized words are numerous during construction of a dictionary of a specific field of expertise.

FIG. 2 shows an example where frequencies at which character strings and pronunciations thereof appear have been calculated. In order to achieve highly accurate speech processing, it is desirable that not only sets of character strings and pronunciations thereof which should be recognized as words, but also information on appearance frequencies of the respective words be utilized. FIG. 2 show frequencies at which respective subsequent character strings consecutively follow certain preceding character strings. For example, the frequency at which a subsequent character string "ka (becoming)" consecutively follows a preceding character string "rinsan (phosphoric acid)" is expressed by a numerical value of 0.8. This numerical value is calculated by, after having listed all of locations where the character string "rinsan" appears in a certain training text, calculating an appearance frequency with respect to each character string that follows the character string "rinsan". For details, refer to S. Mori and D. Takuma, "Word N-gram Probability Estimation From A Japanese Raw Corpus," in Proc. ICSLP, 2004.

As has been described above, also by this method, appearance frequencies of character strings can be cyclopedically calculated. However, if appearance frequencies are calculated assuming that all of character strings each consisting of one or more characters form words, information on results of the calculation is so enormous, that efficiency of speech processing utilizing the information may possibly be decreased in some cases.

In contrast, an object of a word acquisition system 30 according to this embodiment is to acquire, with high accuracy, sets of character strings and pronunciations thereof that should be newly recognized as words in an efficient manner while excluding unnecessary words. A specific configuration thereof will be described below.

Figure 3:
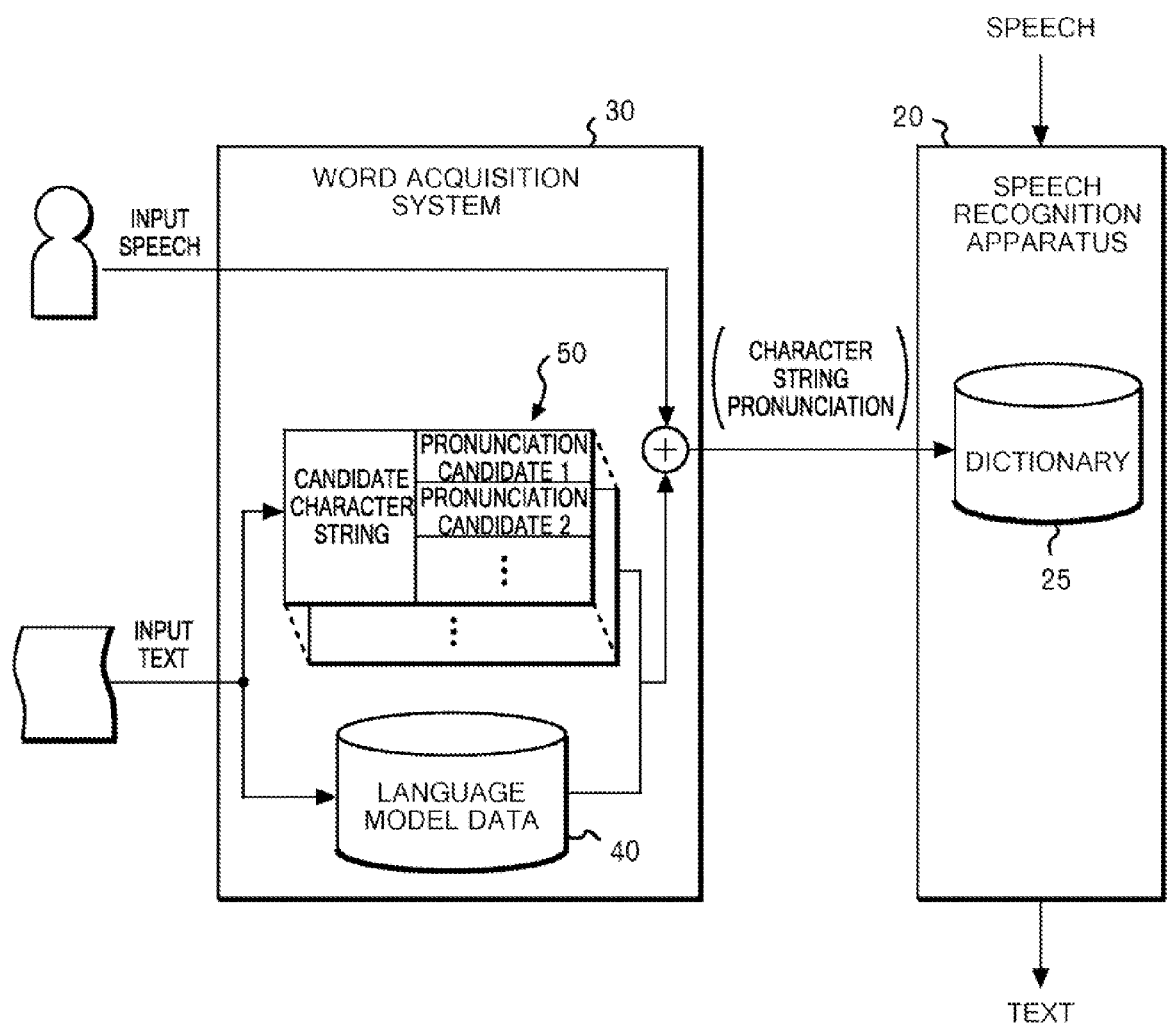
FIG. 3 shows a configuration of a word acquisition system 30 and an entirety of a periphery thereof according to the present embodiment.

FIG. 3 shows the configuration of the word acquisition system 30 and an entire periphery thereof according to this embodiment. A speech and a text are inputted to the word acquisition system 30. These text and speech are of the content of a common event of a predetermined field. As for the predetermined fields, it is desirable to select one of fields expected to contain certain words that are to be registered in the dictionary for speech recognition or the like. For example, a text and a speech in a chemical field are used in a case where words in the chemical field are wished to be registered. Hereinafter, a speech and a text which have been inputted will be referred to as an input speech and an input text.

The word acquisition system 30 selects, from the input text, at least one candidate character string which is a candidate to be recognized as a word. Then, the word acquisition system 30 generates plural candidates for the pronunciation of each selected candidate character string. Data thus generated will be referred to as candidate data 50. On the other hand, the word acquisition system 30 calculates an appearance frequency at which the candidate character string appears in the input text. Then, an appearance probability that each of the candidate character strings appears is calculated by use of the above calculated frequency. Hereinafter, data obtained by calculating such probabilities will be referred to as language model data 40. The language model data 40 may be a numerical value of an appearance frequency or appearance probability calculated for each of the candidate character strings. Instead of or in addition to this, the language model data 40 may be a numerical value of an appearance frequency or an appearance probability calculated for each set of plural consecutive candidate character strings. More specifically, the appearance frequency or the appearance probability is one at which each set of plural consecutive candidate character strings appears in the input text.

Next, the word acquisition system 30 combines the language model data 40 with the candidate data 50, and generates frequency data, each piece of which indicates an appearance frequency of a set of a character string indicating a word and a pronunciation thereof. For example, here, assume that a candidate character string is pronounced by use of several pronunciation candidates with the same probability. On this assumption, the appearance frequency can be calculated for each set of the candidate character string and the pronunciation candidate, because the language model data 40 includes the appearance frequency of the candidate character string. Then, based on this frequency data, the word acquisition system 30 performs speech recognition on the input speech.

From the sets of candidate character strings and pronunciation candidates generated as the candidate data 50, the word acquisition system 30 selects a set of a character string and a pronunciation which has been obtained in the course of processing of the speech recognition. The word acquisition system 30 then outputs the selected set to a speech processing apparatus 20. That is, outputted is a word whose pronunciation appears in the input speech, and whose corresponding character string appears at a high frequency in the input text. In a case where the speech recognition employs an n-gram model, what is taken into consideration is not only an appearance frequency of an individual word but also an appearance frequency of the individual word including a preceding and subsequent context. That is, a set of a character string candidate and a pronunciation candidate is recognized as a word further on condition that a context where a certain pronunciation appears in an input text is similar to contexts where a character string corresponding to the certain pronunciation frequently appears in the input text.

The words having been thus output may be registered in a dictionary memorizing unit 25, and be used as a dictionary for speech processing in a field corresponding to the input speech and the input text. For example, by using the dictionary memorizing unit 25, the speech processing apparatus 20 recognizes the input speech, and outputs a text indicating a result of the recognition. Instead of this, the speech processing apparatus 20 may generate a synthesized speech from the text by using the dictionary memorizing unit 25. At this time, because only necessary and sufficient words are registered in the dictionary memorizing unit 25, a hardware resource for implementing the speech processing apparatus 20 can be reduced, and efficiency of the recognition processing can be enhanced.

Figures 4A, 4B:
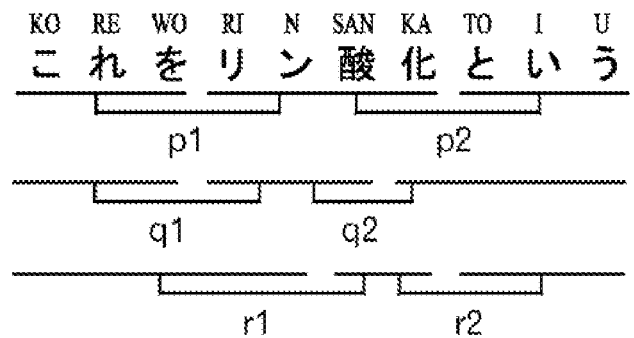
FIG. 4A shows specific examples of respective frequency values contained in language model data 40 in contrast with an example of an input text.
FIG. 4B shows one example of the language model data 40 by use of a tabular format.

FIG. 4A shows specific examples of the respective frequency values contained in language model data 40 in contrast with an example of the input text. FIG. 4B shows one example of the language model data 40 by use of a tabular format. By referring to FIGS. 4A and 4B, a description will be given for a summary of processing in which the data in a tabular format shown in FIG. 4B is generated from the input text. In a language such as Japanese, character strings each indicating a word appear continuously in a text, and segmentation thereof by word are not explicitly shown in the text. Accordingly, in order to appropriately select a character string that should be recognized as a word, it is desirable that segmentation of character strings by word be appropriately recognized. On the other hand, it is difficult to uniquely determine, only on the basis of the text, segmentation of character strings by word since the segmentation by word are not explicitly shown therein. For this reason, the word acquisition system 30 assumes each character string consisting of one or more characters to be a word, calculates the frequency at which each of the words appears in the input text consecutively with another one of the words, and sets, as the language model data 40, a set of appearance probabilities based on these frequencies.

Specifically, in the example of FIG. 4A, a character string "koreo rinsanka toiu (this is called phosphorylation)" is contained in the input text. Here, a frequency at which a character string "rinsanka" appears consecutively following a character string "koreo" in the input text is p1. Additionally, a frequency at which a character string "toiu" appears consecutively following a character string "rinsanka" in the input text is p2. On the other hand, as to a character string "rinsanka toiu", not only segmentation "rinsanka/toiu", but also segmentation "rinsan/katoiu" can be assumed. In this case, the frequency at which "rinsan" consecutively follows "koreo" is, for example, q1.

Additionally, a character string "koreo rinsan" appears not only in a character string "koreo rinsanka toiu," but also in a character string having such a context as "koreo rinsan toiu (this is called phosphoric acid)". Therefore, this frequency q1 becomes a sum of frequencies at which "koreo rinsan" appears in each of the various contexts. Similarly, segmentation by word "koreorin/sanka/toiu" can also be assumed. In this case, the frequency at which "toiu (is called)" consecutively follows "sanka (oxidation)" is r2. If such a context as "kono kagakuhannou nokoto o sanka toiu (this chemical reaction is called oxidation)" appears in the input text, the frequency at which such a context appears is also considered in calculating the frequency r2.

Frequency values as described above are normalized in a manner that the values for every preceding word or the values for every subsequent word sum up to 1, and then, are converted into appearance probability values. For example, as shown in FIG. 4B, among all of words (probability values of these words sum up to 1) likely to consecutively follow a preceding word "koreorin", a probability that a word "sanka" follows this preceding word is 0.05, whereas the probability that a word "sanka toiu" follows this preceding word is 0.05. If such probability values are calculated previously, what word highly likely to follow a certain word can be known, whereby accuracy of the speech recognition can be enhanced.

FIG. 5 shows a specific example of the candidate data 50. An ideograph such as a Japanese kanji has plural pronunciations. Accordingly, even if a character string that should be recognized as a word has been determined, it is difficult to uniquely determine a pronunciation thereof in some cases. For example, in a candidate character string "rinsanka", a kanji indicating "acid" has a pronunciation "su" in addition to a pronunciation "sa-n". Additionally, a kanji indicating "becoming" has pronunciations "ba" and "ba-ke" in addition to a pronunciation "ka". For this reason, the candidate character string "rinsanka" has various pronunciation candidates such as "ri-n-sa-n-ka", "ri-n-su-ka" and "ri-n-sa-n-ba". The candidate data 50 are data in which pronunciation candidates are associated with each of the candidate character strings, the pronunciation candidates generated only from characters in the candidate character string.

The candidate data 50 may further contain a probability value for each candidate character string, in association with each of pronunciation candidates. The probability value indicates the probability that the candidate character string is pronounced by the each of pronunciation candidates. In an example of FIG. 5, the probability that "rinsanka" is pronounced as "ri-n-sa-n-ka" is s1. This probability value may be generated in a way that the pronunciation generation unit 310 associates an equal value with pronunciation candidates of each character string candidate. That is, if the number of pronunciation candidates is 6, 1/6 is associated with each of the pronunciation candidates. Instead of this, when generating the pronunciation candidates by using a technique such as character n-gram (refer to T. Nagano, S. Mori, and M. Nishimura, "A Stochastic Approach to Phoneme and Accent Estimation," in Proc. INTERSPEECH, 2005), the pronunciation generation unit 310 may associate a probability value with a pronunciation candidate which has been generated as one being the most likely, as follows. Specifically, such pronunciation candidate may be associated with a probability value that is higher than those for the other pronunciation candidates, or, with a probability value in accordance with the probability based on character n-gram.

Figure 6:
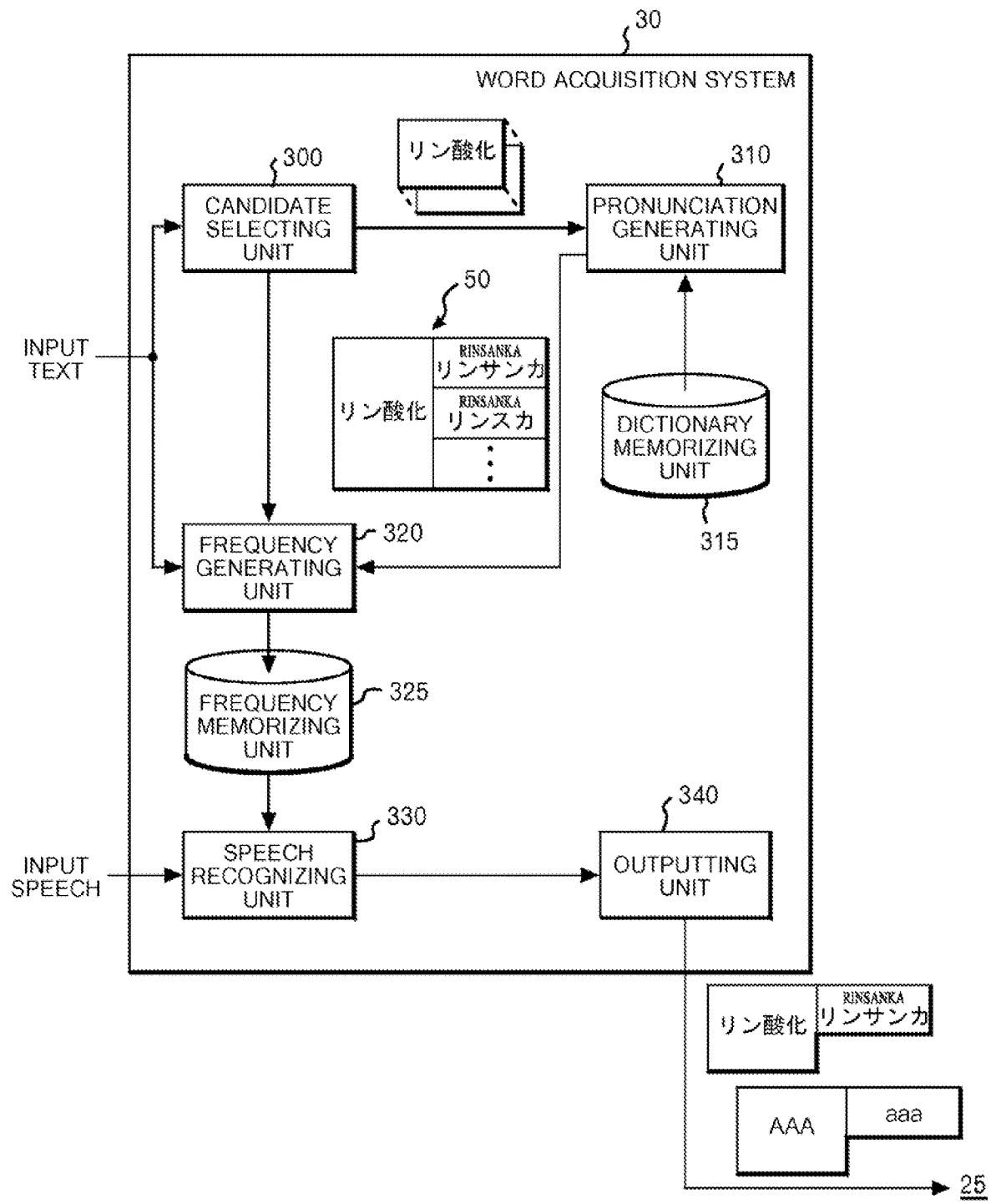
FIG. 6 shows a functional configuration of the word acquisition system 30.

FIG. 6 shows a functional configuration of the word acquisition system 30. By causing a later described CPU 1000, a RAM 1020 and a host controller 1082 to collaborate with each other, the word acquisition system 30 functions as a candidate selecting unit 300, a pronunciation generating unit 310, a dictionary memorizing unit 315, a frequency generating unit 320, a frequency memorizing unit 325, a speech recognizing unit 330 and an outputting unit 340. Additionally, the frequency generating unit 320, the frequency memorizing unit 325, the speech recognizing unit 330 and the outputting unit 340 function as a word acquiring unit according to the present invention. The candidate selecting unit 300 selects at least one candidate character string which becomes a candidate to be recognized as a word in the input text. The candidate character strings may be all of character strings each consisting of one or more characters contained in the input text, or may be a certain part of the character strings. For example, a candidate character string "rinsanka" is selected form an input text in a certain chemical field. What character strings should be selected as the candidate character strings will be described later.

The pronunciation generating unit 310 generates, for each of the selected candidate character strings, at least one pronunciation candidate of the each of the candidate character strings by combining together pronunciations predetermined for characters contained in the each of the candidate character strings. For example, a pronunciation dictionary may be used to generate the pronunciation candidates. That is, the dictionary memorizing unit 315 memorizes therein the pronunciation dictionary in which characters are each associated with one or plural pronunciations. While having one pronunciation associated with each of the Japanese hiragana and katakana characters as a general rule, this pronunciation dictionary has two or more pronunciations associated with a kanji character in some cases. In addition, after having scanned characters one by one in a candidate character string, the pronunciation generating unit 310 generates plural pronunciation candidates by retrieving pronunciations corresponding to the respective characters from the pronunciation dictionary, and combining them together. The pronunciation generating unit 310 outputs, to the frequency generating unit 320, the candidate data 50 in which the generated pronunciation candidates are associated with the candidate character string.

The frequency generation unit 320 generates the frequency data by combining the language model data 40 with the candidate data 50. In the language model data 40, numerical values each indicating frequencies at which a word appears in the text are recorded beforehand. Here, assume that a certain candidate character string is pronounced by use of several pronunciation candidates with the same probability, for example. On this assumption, an appearance frequency of each set of the candidate character string and the pronunciation candidate can be calculated because the appearance frequency of the candidate character string is included in the language model data 40. More specifically, assume that an appearance frequency of a certain candidate character string 1 has been recorded as a numerical value 0.8 in the language model data 40. If pronunciation candidates 1 and 2 are associated with the candidate character string 1, frequency data are generated by associating a numerical value 0.4, which is half the value of the appearance frequency 0.8, with a set of the candidate character string 1 and the pronunciation candidate 1, and also with a set of the candidate character string 1 and the pronunciation candidate 2.

Additionally, this language model data 40 may be configured to indicate appearance frequencies obtained by previously analyzing general words, but preferably, it may be generated based on an input text. Specifically, the frequency generation unit 320 may calculate frequencies at which the respective candidate character strings appear in the input text, and frequencies at which each of these candidate character strings appears consecutively with the respective other candidate character strings, and then generate, based on these frequencies, the language model data 40. The frequency generating unit 320 stores, in the frequency memorizing unit 325, the frequency data thus generated by combining the language model data 40 with the candidate data 50.

Next, the speech recognizing unit 330 performs, based on this frequency data, speech recognition on the input speech. Specifically, the speech recognition is realized by, for example, a method called an n-gram model. After having specified pronunciations of respective phonemes contained in the input speech, the speech recognizing unit 330 compares, with each of pronunciations contained in the frequency data, a pronunciation string having the specified pronunciations arrayed in the order by which they are pronounced. Then, the speech recognizing unit 330 retrieves, from the frequency data, a combination out of combinations of the pronunciations agreeing with the pronunciation string, the combination maximizing a product of corresponding appearance frequencies. Then, the speech recognizing unit 330 generates recognition data in which the retrieved combination of pronunciations is associated with a corresponding combination of character strings in the frequency data.

Note that, in order to be able to appropriately recognize general nouns, particles, verbs and the like, it is desirable that the speech recognizing unit 330 should use, in addition to this frequency data, language model data previously acquired from the outside. Additionally, in order be able to convert speech wave patterns of the input speech into data of pronunciations with high accuracy, the speech recognizing unit 330 is required to acquire, from the outside, acoustic model data, and to use this data in addition to the frequency data. Recorded in the acoustic model data are appearance probabilities of sets each consisting of a speech wave pattern and data of pronunciations.

In this recognition data indicating a result of the recognition, for each set of plural words contained in the input speech, a character string indicating the plural words is associated with a pronunciation. The outputting unit 340 selects and outputs a combination contained in this recognition data, out of combinations each consisting of a candidate character string generated by the candidate selecting unit 300, and a pronunciation candidate generated by the pronunciation generating unit 310. That is, for example, on conditions that a pronunciation "ri-n-sa-n-ka" is contained in the input speech, and that the pronunciation is recognized as a character string "rinsanka" in the speech recognition, pronunciations such as "ri-n-su-ka" which have been associated with the candidate character string "rinsanka" are excluded, and only the pronunciation "ri-n-sa-n-ka" is outputted in association with the character string "rinsanka". By thus retrieving words by use of the result of the speech recognition, it is possible to highly accurately acquire a word having a pronunciation contained in the input speech, and having a context of the pronunciation similar to a context in which a character string corresponding to the pronunciation frequently appears in the input text.

Figures 7, 8:
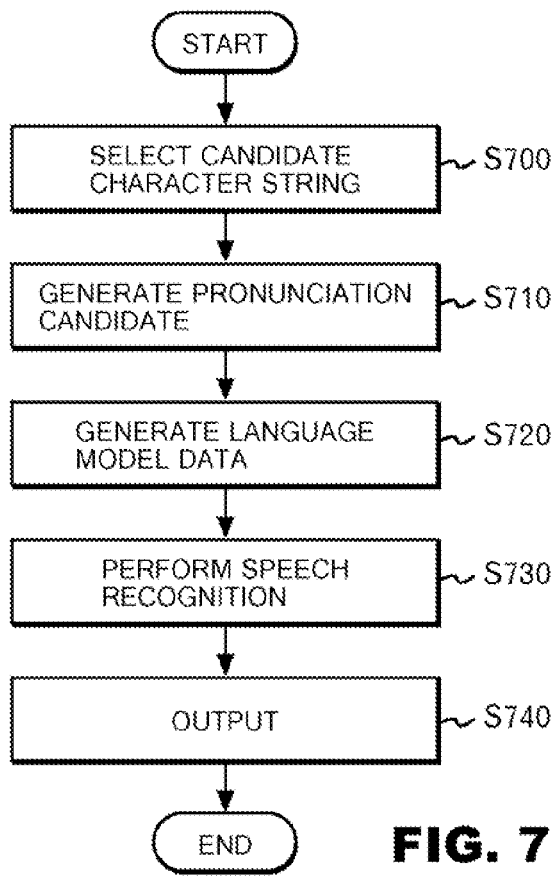
FIG. 7 shows a flow of processing in which the word acquisition system 30 selects and outputs a character string that should be recognized as a word.
FIG. 8 shows an example of specific processing in S700.

FIG. 7 shows a flow of processing in which the word acquisition system 30 selects and outputs a character string that should be recognized as a word. Firstly, the candidate selecting unit 300 selects candidate character strings from the input text (S700). So as to enhance efficiency of subsequent processing, it is desirable that the candidate character strings be limited to those highly likely to be recognized as words. One example thereof will be described by referring to FIG. 8.

FIG. 8 shows an example of specific processing in S700. The candidate selecting unit 300 sequentially adds, to a certain character string included in the input text, other character strings from the front-end or the tail-end of the certain character string. For example, the candidate selecting unit 300 adds "katsu" to the tail-end of a character string "adenirusansikuraaze (adenylate cyclase)" to generate a character string "adenirusansikuraazekatsu". Additionally, the candidate selecting unit 300 adds "ri" to the head side thereof to generate a character string "riadenirusansikuraaze." Such processing is repeated until an appearance frequency in the input text of a character string obtained by such addition becomes smaller than an appearance frequency in the input text of a character string before the addition. After the appearance frequency has become smaller, any one of the front-end and the tail-end of the character string before the addition is regarded as a candidate of a boundary of a candidate character string. To be specific, any one of the ends is the end to which a character has been added to generate the above-mentioned character string having the smaller appearance frequency. Thereafter, on condition that both of the front-end and the tail-end have become candidates of boundaries, the candidate selecting unit 300 selects the character string before the addition as a candidate character string. By thus configuring the processing, a character string that appears in the input text at a certain frequency can be selected as a candidate character string by assuming that the character string is likely to be a coherent semantic unit. Note that the selection of the candidate character strings may be achieved by some other method as long as the method can generate a set of character strings sufficient to contain character strings that should be recognize as words.

Description returns to FIG. 7. Next, with respect to each of the selected candidate character strings, the pronunciation generating unit 310 generates at least one pronunciation candidate (S710). The pronunciation candidate may be generated based on the pronunciation dictionary as has been described above, or may be generated by use of a technique called character n-gram. The technique called character n-gram is a technique utilizing the frequency at which each set of a character and a pronunciation appears in a training text and a training speech which indicate the same contents as each other. Refer to T. Nagano, S. Mori, and M. Nishimura, "A Stochastic Approach to Phoneme and Accent Estimation," in Proc. INTERSPEECH, 2005 for details.

Then, the frequency generating unit 320 performs the following processing in order to generate the frequency data (S720). In the first place, the frequency generating unit 320 generates the language model data 40 based on the input text. More specifically, the frequency generating unit 320 firstly finds the frequency at which each of the character string contained in an input text appears in the input text, and/or the frequencies at which each of the character strings and other character strings consecutively appear in the input text. Then, the frequency generating unit 320 generates the language model data 40 by calculating, based on the frequencies, the probability that each of the candidate character strings appears. Since a specific method for implementing the generation processing is described, for example, in S. Mori and D. Takuma, "Word N-gram Probability Estimation From A Japanese Raw Corpus," in Proc. ICSLP, 2004 as a stochastic word segmentation technique, detailed explanation thereof will be omitted.

Next, the frequency generating unit 320 generates the frequency data by combining, with the language model data 40, the candidate data 50 in which the pronunciation candidates are respectively associated with the candidate character strings. The frequency data is configured to express an appearance frequency of each set of candidate character strings and pronunciations thereof. One example thereof is shown in FIG. 9.

FIG. 9 shows one example of the frequency data generated in S720 and memorized in the frequency memorizing unit 325. This frequency data is used in a language model called a bi-gram model. That is, this frequency data expresses the frequency at which each set of two consecutive pronunciations and two consecutive character strings appears in the input text. As one example, a probability that a subsequent word having a character string "sanka" and a pronunciation "sa-n-ka" consecutively appear after a preceding word having a set of a character string "koreorin" and a pronunciation "ko-re-o-ri-n" is 0.05. By referring to this frequency data, it is possible to easily discriminate, by finding out how the input speech is segmented into words and what character strings these words are associated with, a manner in which a combination of words that has a high appearance frequency is obtained.

Figure 10:
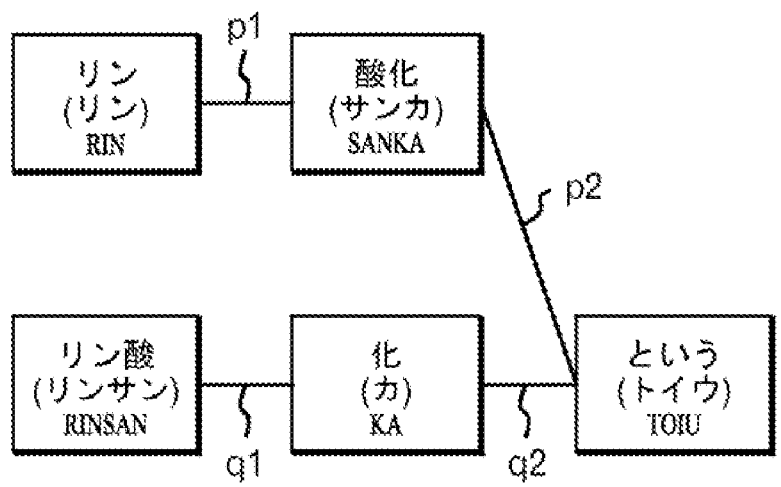
FIG. 10 shows one example of speech recognition processing in S730.

Description returns to FIG. 7. Next, the speech recognizing unit 330 performs, based on this frequency data, speech recognition on the input speech to generate the recognition data in which a character string indicating each of the plural words contained in the input speech is associated with a pronunciation (S730). Then, the outputting unit 340 selects and outputs a combination contained in this recognition data among combinations each consisting of a candidate character string and a pronunciation candidate (S740). Referring to FIG. 10, one example of this speech recognition processing will be described.

FIG. 10 shows one example of the speech recognition processing in S730. The speech recognition unit 330 retrieves, from the frequency data, a combination of pronunciations agreeing with an input speech "rinsanka toiu," and a combination of character strings corresponding to the combination of the pronunciations. As a result, for example, a combination of "rin (ri-n)/sanka (san-ka)/toiu (to-i-u)" and a combination of "rinsan (ri-n-sa-n)/ka (ka)/toiu (to-i-u)" are retrieved (hereinafter, a word having a certain character string and a certain pronunciation corresponding thereto will be expressed as "character string (pronunciation)"). Note that even combinations having the same boundaries of words/phases are detected as different combinations if character strings corresponding to these combinations are different from each other. For example, if the pronunciation "sa-n-ka" is associated with a character string indicating "participation" in the frequency data, even the same word segmentation "ri-n/sa-n-ka/to-i-u" is detected as different combinations of pronunciations and of character strings.

Then, the speech recognition unit 330 calculates, with respect to each set of a combination of pronunciations, and a combination of character strings, an appearance frequency thereof. For example, if the bi-gram model is taken as an example, the speech recognition unit 330 reads, from the frequency data, a frequency of each set of two consecutive pronunciations contained in a combination of pronunciations. In the example of FIG. 10, a frequency p1 at which "rin (ri-n)/sanka (sa-n-ka)" continues in "rin (ri-n)/sanka (sa-n-ka)/toiu (to-i-u)", and a frequency p2 at which "sanka (sa-n-ka)/toiu (to-i-u)" continues therein are read. Then, by multiplying together the respective frequencies having been read, the speech recognition unit 330 calculates a frequency P1 at which a combination of the pronunciations "rin (ri-n)/sanka (sa-n-ka)/toiu (to-i-u)" appears.

Likewise, a frequency q1 at which "rinsan (ri-n-sa-n)/ka (ka)" continues in "rinsan (ri-n-sa-n)/ka (ka)/toiu (to-i-u)", and a frequency q2 at which "ka (ka)/toiu (to-i-u)" continues therein are read. Then, by multiplying together the respective frequencies having been read, the speech recognition unit 330 calculates a frequency P2 at which a combination of the pronunciations "rinsan (ri-n-sa-n)/ka (ka)/toiu (to-i-u)" appears.

The speech recognition unit 330 selects a combination of pronunciations and character strings that maximizes a product of thus calculated frequencies. That is, in the example of FIG. 10, the speech recognition unit 330 compares P1 and P2, selects a combination of pronunciations and character strings which corresponds to the larger one of such products, and outputs the selected combination as the recognition data. As has been described above, by using the frequency data, appropriate segmentation and character strings can be outputted in a manner reflecting appearance frequencies of words in contexts, even in a case where, for the same input speech, there are plural manners of word segmentation or plural candidates of a character string.

Note that, because a purpose of the speech recognition processing is to uniquely determine a text showing a content of a speech, it is desirable that a text maximizing the product of such appearance frequencies be generated as the recognition data. Meanwhile, an object of the word acquisition system 30 according to this embodiment is to output a pronunciation in the input speech in association with a character string which is used relatively frequently in consideration of contexts. For this reason, it is only necessary that, even if a set of a pronunciation and a character string that should be output is not contained in a combination whose product of such appearance frequencies is the largest, the set be contained in a combination whose product of such appearance frequencies is relatively large. That is, the outputting unit 340 may select and output, from candidate character strings and candidates of pronunciations, those contained in a predetermined criterial number of combinations each consisting of character strings and pronunciations, the combinations having the largest products of such appearance frequencies calculated by the speech recognition unit 330.

On the other hand, in order to enhance accuracy in word acquisition by limiting the number of outputted words, it may be set as a condition that each of the outputted words should appear in the recognition data not less than a criterial number of times. That is, the outputting unit 340 may output a combination of a candidate character string and a pronunciation candidate contained in the recognition data, on condition that the combination appears in the recognition data not less than the criterial number of times.

As has been described above, according to the word acquisition system 30 of this embodiment, if an input speech and an input text belonging to the same or similar fields are available, a character string and a pronunciation thereof which indicate a word used in that same field or those similar fields are automatically acquired even if the input speech and the input text are not those having the same contents described in the same order. A pronunciation of a word is selected from the input speech, and a character string of the word is selected from the input text. A candidate character string and a pronunciation candidate corresponding thereto which are acquired as a word are selected on condition that a context in which the pronunciation candidate appears in the input speech, and a context in which the candidate character string appears in the input text, are approximate to each other by not less than a predetermined criterion. Thereby, it becomes less likely that unnecessary fragments of words are included, and quality of a group of selected words can be enhanced.

According to an experiment made by the inventors, it was confirmed that technical terms can be sufficiently acquired in practice. Additionally, a data size of the acquired set of words was not more than half of the size of a dictionary automatically generated by use of a conventional technique. Moreover, it was confirmed that a performance is improved as compared to a conventional case if the set is used as a dictionary for speech recognition.

Next, processing will be described as a modification example in which, instead of having the language model data 40 generated from the input text, language model data previously generated with respect to words in a general field is utilized as the language model data 40.

Figure 11:
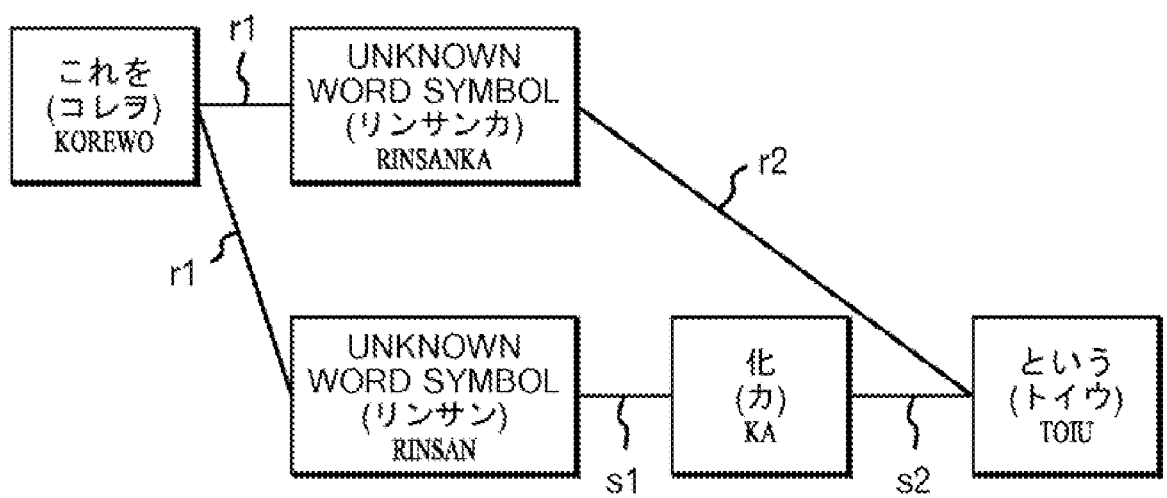
FIG. 11 shows one example of speech recognition processing in a modification example of the present embodiment.

FIG. 11 shows one example of speech recognition processing in the modification example of this embodiment. Firstly, the frequency generation unit 320 acquires, as the language model data 40, the language model data generated with respect to words in the general field. This language model data is configured to record therein, for each set of at least two words selected from a group of words, a numerical value (for example, an appearance probability) indicating the frequency at which the at least two words consecutively appear in a text. The modification example is different from the abovementioned embodiment described with reference to FIGS. 1 to 10 in that this text is not an input text but a previously prepared training text. Accordingly, this language model data 40 does not contain technical words such as those appearing in the input text.

In order to be able to appropriately perform recognition on a sentence as a whole even when such technical words are included, the language model data 40 records therein information on an appearance frequency of an unknown word symbol indicating some character string that is unrecognizable as a word. In detail, the language model data 40 considers the unknown word symbol to be a word, and records, with respect to a set of words which contains the unknown word symbol and actual words, the frequency at which each set of words contained therein consecutively appear. In the example of FIG. 11, the language model data 40 records therein r1 as the frequency at which some unrecognizable character string consecutively follows the character string "koreo".

Then, by associating the candidate character strings with each of the unknown word symbols contained in the language model data 40, the frequency generation unit 320 generates the frequency data. For example, in this frequency data, the frequency at which "rinsanka (ri-n-sa-n-ka)" consecutively follows the character string "koreo" is r1, and the frequency at which "rinsan (ri-n-sa-n)" consecutively follows "koreo" is also r1. That is, for any character string, the frequency at which the character string consecutively follows "koreo" is r1 if the character string is not contained in this frequency data.

Then, the speech recognition unit 330 performs, based on the thus generated frequency data, speech recognition on an input speech. For example, a pronunciation string "ko-re-o-ri-n-sa-n-ka-to-i-u" agrees with a combination of words "koreo (ko-re-o)/unknown word symbol/toiu (to-i-u)" and also with a combination of words "koreo (ko-re-o)/unknown word symbol/ka (ka)/toiu (to-i-u)". These unknown word symbols are the same, but the unknown word symbol agrees with a pronunciation "ri-n-sa-n-ka" in the first combination, and agrees with a pronunciation "ri-n-sa-n" in the second combination. That is, the speech recognition unit 330 judges the "unknown word symbol" to agree with any pronunciation. Note that the "unknown word symbols" may be provided in accordance with classifications based on numbers of phonemes, or the like. In this case, the speech recognition unit 330 judges that one unknown word symbols provided for a certain number of phonemes agrees with any pronunciation having that certain number of phonemes, and that this unknown word symbol does not agree with other unknown word symbols provided for other numbers of phonemes.

Then, the speech recognition unit 330 calculates a product of appearance frequencies for each of the combinations. In detail, for "koreo (ko-re-o)/unknown word symbol/toiu (to-i-u)", a product Q1 of the frequency r1 at which "unknown symbol word" consecutively follows the character string "koreo", and the frequency r2 at which "toiu (to-i-u)" consecutively follows "unknown symbol word" is calculated. Likewise, for "koreo (ko-re-o)/unknown word symbol/ka (ka)/toiu (to-i-u)", a product Q2 of the frequency r1 at which "unknown symbol word" consecutively follows the character string "koreo (ko-re-o)", a frequency s1 at which "ka (ka)" consecutively follows "unknown symbol word", and a frequency s2 at which "toiu (to-i-u)" consecutively follows "ka (ka)" is calculated. Then, the speech recognition unit 330 outputs a combination of character strings and pronunciations as the recognition data, the combination maximizing the product of such frequencies.

According to this modification example, on condition that a pronunciation contained in the input speech appears in a context in which an unrecognizable character string is highly likely to appear, the pronunciation and the character string can be acquired as a word that should be newly acquired. According to this modification example, processing of generating the language model data from an input text can be omitted, whereby processing efficiency can be improved.

Figure 12:
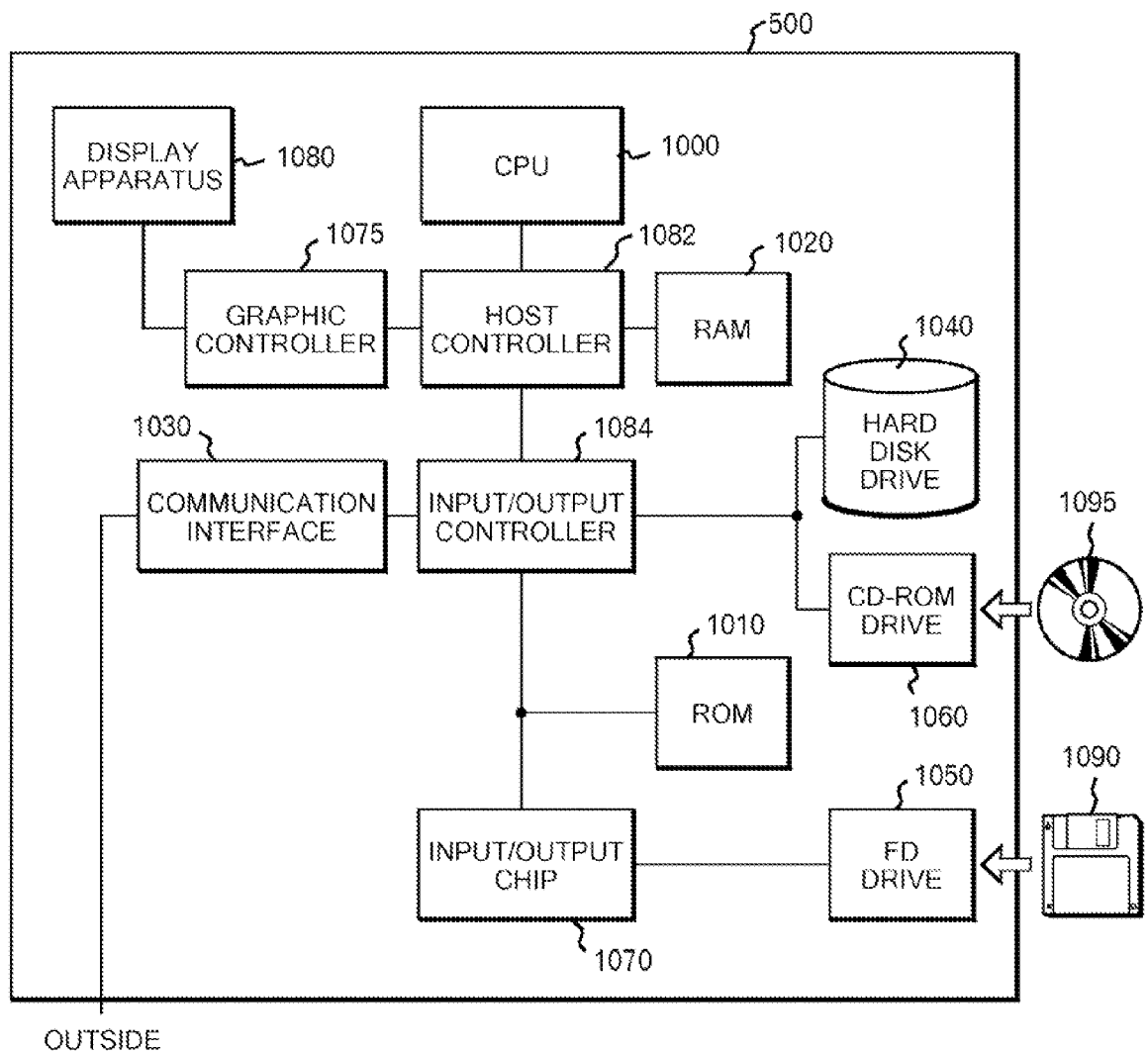
FIG. 12 shows one example of a hardware configuration of a computer 500 which functions as the word acquisition system 30.

FIG. 12 shows one example of a hardware configuration of a computer 500 which functions as the word acquisition system 30. The computer 500 includes: a CPU peripheral section including the CPU 1000, the RAM 1020 and a graphic controller 1075 which are mutually connected by a host controller 1082; an input/output section including a communication interface 1030, the hard disk drive 1040, and a CD-ROM drive 1060 which are connected to the host controller 1082 by an input/output controller 1084; and a legacy input/output section including a ROM 1010, a flexible disk drive 1050 and an input/output chip 1070 which are connected to the input/output controller 1084.

The host controller 1082 connects the RAM 1020 with the CPU 1000 and the graphic controller 1075 which access the RAM 1020 at high transfer rates. The CPU 1000 operates based on programs stored in the ROM 1010 and RAM 1020, and thereby performs control over the respective sections. The graphic controller 1075 acquires image data generated by the CPU 1000 or the like on a frame buffer provided in the RAM 1020, and displays the image data on a display apparatus 1080. Instead of this, the graphic controller 1075 may include, inside itself, a frame buffer in which image data generated by the CPU 1000 or the like is stored.

The input/output controller 1084 connects the host controller 1082 with the communication interface 1030, the hard disk drive 1040 and the CD-ROM drive 1060 which are relatively high speed input/output devices. The communication interface 1030 communicates with an external apparatus through a network. The hard disk drive 1040 stores therein programs and data which are used by the computer 500. The CD-ROM drive 1060 reads a program or data from a CD-ROM 1095, and provides the program or data to the RAM 1020 or the hard disk drive 1040.

Additionally, the ROM 1010, and relatively low speed input/output devices, such as the flexible disk drive 1050 and the input/output chip 1070, are connected to the input/output controller 1084. The ROM 1010 stores therein: a boot program executed by the CPU 1000 at the startup of the computer 500; and other programs dependent on hardware of the computer 500; and the like. The flexible disk drive 1050 reads a program or data from a flexible disk 1090, and provides the program or data through the input/output chip 1070 to the RAM 1020 or to the hard disk drive 1040. The input/output chip 1070 connects, to the CPU 1000, the flexible disk 1090, and various kinds of input/output devices through, for example, a parallel port, a serial port, a keyboard port, a mouse port and the like.

A program provided to the computer 500 is stored in a recording medium such as the flexible disk 1090, the CD-ROM 1095 or an IC card, and is provided by a user. The program is executed after being read from the recording medium through at least any one of the input/output chip 1070 and input/output controller 1084, and then being installed in the computer 500. Description on operations which the program causes the computer 500 and the like to perform will be omitted because these operations are identical to the operations in the word acquisition system 30 which have been described in connection with FIGS. 1 to 11.

The program described above may be stored in an external recording medium. As the recording medium, apart from the flexible disk 1090 and the CD-ROM 1095, it is possible to use: an optical recording medium such as a DVD or a PD; a magneto optical recording medium such as an MD; a tape medium; a semiconductor memory such as an IC card; or the like. Additionally, it is also possible to provide the program to the computer 500 through a network by using, as the recording medium, a recording device such as a hard disk or a RAM which is provided in a server system connected to a dedicated communication network or the Internet.

Although the present invention has been described above by using the embodiment, a technical scope of the present invention is not limited to the scope described in the above described embodiment. It is clear to those skilled in the art that a variety of alterations and improvements can be added to the above described embodiment. Additionally, it is obvious from description in the scope of claims that embodiments obtained by adding such alterations or improvements to the embodiment can also be included in the technical scope of the present invention.

That which is claimed is:

1. A system for acquiring, from an input text and an input speech, a set of a character string and a pronunciation thereof which should be recognized as a word, the system comprising:

a candidate selecting unit comprising one or more processors executing stored program instructions for selecting, from the input text, at least one candidate character string which is a candidate to be recognized as a word;

a pronunciation generating unit comprising one or more processors executing stored program instructions for generating at least one pronunciation candidate of each of the selected candidate character strings by combining pronunciations of all characters contained in the selected candidate character string, while one or more pronunciations are predetermined for each of the characters;

a frequency generating unit comprising one or more processors executing stored program instructions for generating frequency data indicating appearance frequencies of the respective sets each constituting of a character string indicating a word and a pronunciation thereof, the frequency data generated by combining data in which the generated pronunciation candidates are respectively associated with the character strings, with language model data prepared by previously recording numerical values based on frequencies at which respective words appear in the text;

a speech recognizing unit comprising one or more processors executing stored program instructions for performing, based on the generated frequency data, speech recognition on the input speech to generate recognition data in which character strings respectively indicating plural words contained in the input speech are associated with pronunciations; and an outputting unit comprising one or more processors executing stored program instructions for selecting and outputting a combination contained in the recognition data, out of combinations each consisting of one of the candidate character strings and one of the pronunciation candidates.

2. The system according to claim 1, wherein the frequency generating unit generates the language model data by calculating frequencies at which the respective candidate character strings appear in the input text and then by calculating, based on the frequencies, probabilities that the respective candidate character strings appear; and generates the frequency data by combining the generated language model data with data in which each of the pronunciation candidates is associated with one of the character strings.

3. The system according to claim 2, wherein the frequency generating unit calculates and thus generates, as the language model data, a probability for each set of at least two of consecutive candidate character strings, the probability indicating a probability that each set of the consecutive candidate character strings appears in an input text.

4. The system according to claim 1, wherein the frequency generating unit generates the frequency data by:

selecting sets each constituting of at least two consecutive words from a group of words containing an unknown word symbol, the unknown word symbol indicating a certain character string unrecognizable as a word;

acquiring the language model data having numerical values recorded therein, the numerical value indicating a frequency at which each of the selected sets of consecutive words appears in a text; and associating each of the candidate character strings with the unknown word symbol.

5. The system according to claim 1, wherein, the candidate selecting unit repeats processing of adding other characters to a certain character string contained in the input text character by character at the front-end or the tail-end of the certain character string, until an appearance frequency in the input text of a character string obtained by such addition becomes smaller than an appearance frequency in the input text of a character string before the addition, and selects the character string before the addition as the candidate character string.

6. The system according to claim 1, wherein the pronunciation generating unit generates a plurality of pronunciation candidates for each of the candidate character strings by:

retrieving one or more pronunciations of each of characters contained in the candidate character string, from a pronunciation dictionary in which each character is associated with one or more pronunciations; and combining together the retrieved pronunciations.

7. The system according to claim 1, wherein the outputting unit outputs a combination of one of the candidate character strings and one of the pronunciation candidates contained in the recognition data, on condition that the combination appears in the recognition data not less than a predetermined criterial number of times.

8. The system according to claim 1, wherein:

based on the frequency data, the speech recognizing unit selects one of combinations constituting of a set of pronunciations agreeing with the input speech and a set of character strings corresponding to the set of the pronunciations, the selected combination constituting of pronunciations and character strings whose appearance frequencies have the largest product among those of the other combinations; and the outputting unit further selects and outputs some of the candidate character strings and some of the pronunciation candidates, the selected candidate character strings and pronunciation candidates included in a predetermined criterial number of combinations of character strings and pronunciations whose appearance frequencies have the predetermined criterial number of the largest products, the appearance frequencies calculated by the speech recognizing unit.

9. The system according to claim 1, wherein:

the input text and the input speech have the contents indicating a common event belonging to a predetermined field; and the outputting unit outputs one or more combinations among combinations each consisting of one of the candidate character strings and one of the pronunciation candidates, the outputted combinations being those contained in the recognition data, and then registers the outputted combinations in a dictionary used in speech processing in the predetermined field.

10. A method of acquiring, from an input text and an input speech, a set of a character string and a pronunciation thereof which should be recognized as a word, the method comprising operating one or more processors executing stored program instructions to:

select, from the input text, at least one candidate character string which is a candidate to be recognized as a word;

generate at least one pronunciation candidate of each of the selected candidate character strings by combining predetermined pronunciations of all characters contained in the selected candidate character string, while one or more pronunciations are predetermined for each of the characters;

generate frequency data by combining data in which the generated pronunciation candidates are respectively associated with the character strings, with language model data prepared by previously recording numerical values based on frequencies at which respective words appear in the text, the frequency data indicating appearance frequencies of the respective sets each consisting of a character string indicating a word, and a pronunciation;

based on the generated frequency data, perform speech recognition on the input speech to generate recognition data in which character strings respectively indicating plural words contained in the input speech are associated with pronunciations; and select and output a combination contained in the recognition data, out of combinations each comprising one of the candidate character strings and one of the pronunciation candidates.

11. A computer program product embodied in computer readable memory for enabling an information processing apparatus to function as a system for acquiring, from an input text and an input speech, a set of a character string and a pronunciation thereof which should be recognized as a word, the computer program product comprising stored program instructions which, when executed by one or more processors, enable the information processing apparatus to function as:

a candidate selecting unit for selecting, from the input text, at least one candidate character string which is a candidate to be recognized as a word;

a pronunciation generating unit for generating at least one pronunciation candidate of each of the selected candidate character strings by combining pronunciations of all characters contained in the selected candidate character strings, while one or more pronunciations are predetermined for each of the characters;

a frequency generating unit for generating frequency data by combining data in which the generated pronunciation candidates are respectively associated with the character strings, with language model data prepared by previously recording numerical values based on frequencies at which respective words appear in the text, the frequency data indicating appearance frequencies of respective sets each consisting of a character string indicating a word, and a pronunciation;

a speech recognizing unit for performing, based on the generated frequency data, speech recognition on the input speech to generate recognition data in which character strings respectively indicating plural words contained in the input speech are associated with pronunciations; and an outputting unit for selecting and outputting a combination contained in the recognition data, out of combinations each consisting of one of the candidate character strings and one of the candidates of a pronunciation thereof.

12. A system for acquiring, from an input text and an input speech, a set of a character string and a pronunciation thereof which should be recognized as a word, the system comprising:

a candidate selecting unit comprising one or more processors executing stored program instructions for selecting, from the input text, at least one candidate character string which is a candidate to be recognized as a word;

a pronunciation generating unit comprising one or more processors executing stored program instructions for generating at least one pronunciation candidate of each of the selected candidate character strings on the basis of respective characters contained in the selected candidate character strings; and a word acquiring unit comprising one or more processors executing stored program instructions for selecting and outputting one of the generated candidate character strings and corresponding one of the pronunciation candidates, on conditions that the selected pronunciation candidate is contained in the input text, and that two contexts in the input speech are similar to each other to an extent not less than a predetermined criterion, one of the contexts having the selected pronunciation candidate appear, and the other of the contexts having the selected candidate character string appear.

* * * * *